United States Patent

[11] 3,597,539

[72] Inventor James M. Clark
Cedar Groove, N.J.

[21] Appl. No. 781,181
[22] Filed Dec. 4, 1968
[45] Patented Aug. 3, 1971
[73] Assignee International Telephone and Telegraph Corporation
Nutley, N.J.

[54] FRAME SYNCHRONIZATION SYSTEM
10 Claims, 14 Drawing Figs.

[52] U.S. Cl. .................... 178/69.5 R, 179/15 BS, 307/269, 328/63
[51] Int. Cl. .................... H04l 7/08
[50] Field of Search .................... 179/15 BS; 328/63, 73, 15 S; 307/269; 178/69.5

[56] References Cited

UNITED STATES PATENTS

| | | | |
|---|---|---|---|
| 3,065,302 | 11/1962 | Kaneko | 179/15 BS |
| 3,065,303 | 11/1962 | Kaneko | 179/15 BS |
| 3,069,504 | 12/1962 | Kaneko | 179/15 BS |
| 3,144,515 | 8/1964 | Kaneko | 179/15 BS |
| 3,317,669 | 5/1967 | Ohnsorge | 178/69.5 |
| 3,518,377 | 6/1970 | Dworkin | 178/69.5 |

*Primary Examiner*—Robert L. Richardson
*Assistant Examiner*—Donald E. Stout
*Attorneys*—C. Cornell Remsen, Jr., Walter J. Baum, Percy P. Lantzy, Philip M. Bolton, Isidore Togut and Charles L. Johnson, Jr.

ABSTRACT: A binary information signal having a given bit rate and a local binary synchronization reference signal are applied to a digital comparison circuit, the output signal thereof indicating a match for mismatch between the binary conditions of successive adjacent bits of the information signal and the reference signal. A flip-flop samples the output of the comparison circuit. A decision circuit responds to the samples from the flip-flop to produce binary "0" when the decision level is exceeded and binary "1" when the decision level is not exceeded. An AND gate coupled to the decision circuit and the comparison circuit provides an output signal only when the comparison circuit indicates a mismatch and the decision circuit produces binary "1" during halt time. This output signal is applied to an INHIBIT gate disposed between a bit rate clock and binary counters to change the counting of the counters to achieve synchronization in less time than required by prior art frame synchronization systems.

INVENTOR
JAMES M. CLARK
BY Alfred C. Hill
AGENT

INVENTOR
JAMES M. CLARK
BY Alfred C. Hill
AGENT

INVENTOR
JAMES M. CLARK
BY Alfred C. Hill
AGENT

INVENTOR
JAMES M. CLARK
BY Alfred C. Hill
AGENT

FRAME SYNCHRONIZATION SYSTEM

BACKGROUND OF THE INVENTION

This invention relates to digital communication systems, such as time division digital multiplexers including pulse code modulation (PCM) equipment and more particularly to the frame synchronization systems employed therein.

Before preceding, it should be noted that as employed herein the term "frame" is defined as one of a series of contingent periods of time during which there are data bits plus one or more synchronization bits with no data bits being present between synchronization bits. In addition, a "multiframe" is a period of time including one or more "frames," and sufficient to include one entire synchronization pattern.

In general, the bits of the synchronization codes vary from one frame to another within the multiframe, but are duplicated from one multiframe to the next.

There are three general types of synchronization codes to which the present invention will respond. First, a distributed type synchronization code including one bit per frame and usually two or more frames per multiframe. For instance, such a code would include "1" in one frame of the multiframe and a "0" in the other frame of the multiframe. Second, a lumped (character) type synchronization code including more than a few bits (one character) per frame, but one frame is a multiframe. Third, a synchronization code which falls between the first and second type of codes. This type of combined synchronization code would have two or more bits per frame, as well as two or more frames per multiframe with the plural synchronization bits being different in each frame of the multiframe.

The general problem is to establish and maintain frame synchronization of a digital communication link in the presence of noise or bit error. A frame synchronization circuit controls the timing counters of a digital multiplexer to make the counter timing synchronous with the format of the data received. This circuit has two primary functions (1) to sense when synchronization is lost and (2) to change the phase of the counters, as required, until synchronization is achieved. A reference synchronization pattern generated from the counters is compared with the incoming signal to detect whether or not the counters are synchronized. If synchronization is lost, the equipment will switch to a search mode. In the search mode, the phase of the counters are changed until it is detected that synchronism is achieved after which the frame synchronization system will change to a sense mode to detect a subsequent loss of synchronization.

With the distribution-type synchronization code, the usual procedure is to sample one bit of each frame, advancing the phase of the counters by one bit each time a mismatch is sampled, except when an averaging or integrating circuit, which responds to the average rate of mismatches, has an output exceeding a certain threshold. The phase of the counters is usually advanced by deleting one clock pulse at the input to the counters, thus, causing the counters to halt momentarily. The threshold of the decision circuit will be exceeded when the mismatch rate is low, and will remain exceeded when the correct phase is reached. This prevents further halting.

When the lumped or combined-type synchronization code is used, the input signal is shifted down a shift register, one character long. When the code in the shift register matches the expected synchronization code, the counters are reset to a count corresponding to the normal time of arrival of the synchronization character. If the next synchronization code does not arrive as expected, shifting and comparing is repeated as before.

As may be determined from the foregoing, conventional frame synchronization circuits for the distributed-type synchronization code do not respond immediately, that is, within one bit time of the digital input because the action centers on the charge and discharge of a capacitor whose associated time constant is longer than one bit time. That is, for the conventional circuit, when an incoming digit bit is compared to the local synchronization reference signal and it does not match, the next digital bit to be examined is the next bit of the next frame.

SUMMARY OF THE INVENTION

An object of this invention is to provide a frame synchronization system which when searching often changes the phase of the counters at the bit rate of the input signal.

Another object of this invention is to provide a frame synchronization system which reduces the time to achieve synchronization. This reduction, with a distributed-type synchronization code, amounts to one-half the time necessary for the above-mentioned conventional synchronization technique to achieve synchronization.

A feature of this invention is the provision of a frame synchronization system comprising a source of binary information signal having a given bit rate and containing a synchronization component; first means to produce a plurality of timing signals; second means coupled to the source and the first means to examine successive bits of the information signal to recognize the synchronization component, and produce a resultant output signal at each examination; and third means coupled to the second means and the first means responsive to the resultant output signal to provide a control signal for timing adjustment of the timing signals of the first means when the resultant output signal indicates an out-of-synchronization condition until synchronization is achieved.

Another feature of this invention is the provision of the frame synchronization system of this invention wherein the first means further produces a local binary synchronization reference signal; and the second means includes digital comparison means coupled to the source and the first means to compare the binary condition of successive bits of the information signal and the binary condition of the reference signal and produce the resultant signal.

BRIEF DESCRIPTION OF THE DRAWING

The above mentioned and other features and objects of this invention will become more apparent by reference to the following description taken in conjunction with the accompanying drawings, in which.

DESCRIPTION OF THE PREFERRED EMBODIMENT

Figure 1:
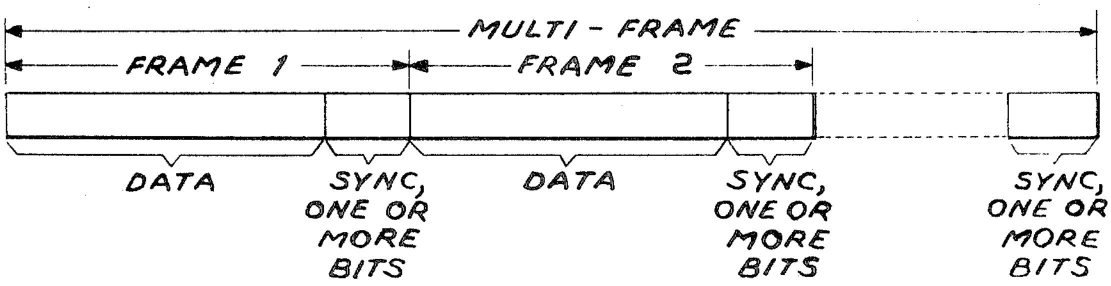
FIG. 1 is an illustration of a "frame" and a "multiframe" as defined hereinabove.

Referring to FIG. 1, the terms "frame" and "multiframe" as defined hereinabove are illustrated for the general case. For purposes of illustration each frame, such as frames 1 and 2, includes data bits and one or more synchronization bits in the sequence illustrated. In the cases of the distributed and combined lumped and distributed synchronization codes, a multiframe includes two or more frames, such as frames 1 and 2. On the other hand, in the case of a lumped synchronization code, a multiframe includes only one frame, such as either frame 1 or frame 2. The distributed type has only one synchronization bit per frame. Assuming a specific synchronization code patter of 1, 0 for the distributed type synchronization code, there would be two frames per multiframe, and frame 1 would include a synchronization bit "1" in its synchronization time and frame 2 would include a synchronization bit "0" in its synchronization time. Assuming a specific synchronization code pattern of 101101 for the lumped-type synchronization code, all six bits would appear once in one frame and in one multiframe. Assuming a specific synchronization code pattern of 101101, 010010 for the combined lumped and distributed code pattern, there would be two frames per multiframe, and frame 1 would include the synchronization bits 101101 in its synchronization time and frame 2 would include the synchronization bits 010010 in its synchronization time. The commas between the portions of the synchronization codes represent places for intervening data. Data also precedes and follows the synchronization code. The number of data bits in each place is the same.

As pointed out hereinabove, there are three general types of synchronization codes. The system of this invention will first be completely described employing a synchronization code or signal of the distributed type with the synchronization bit of each frame alternating between "1" and "0" . Thus, the synchronization pattern will be 1, 0 in each multiframe.

Figure 2:
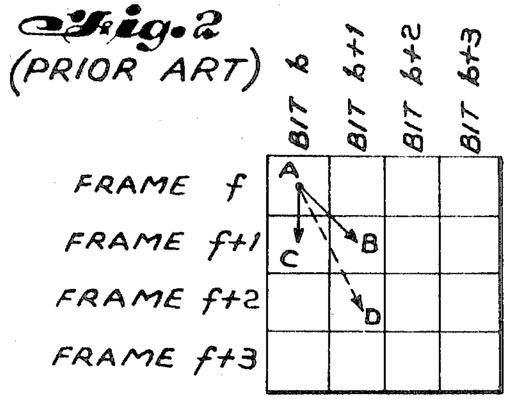
Fig. 2 (PRIOR ART)
FIGS. 2 and 3 are diagrams comparing the technique of this invention with the above-mentioned prior art technique.
Figure 3:
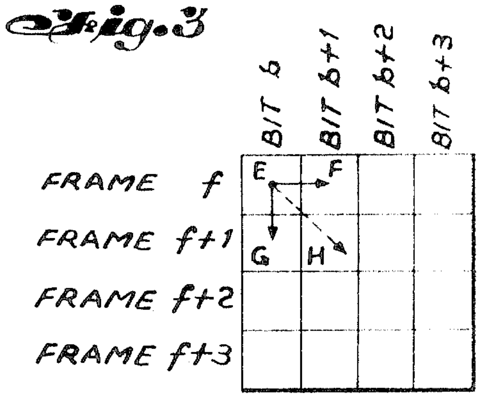

Referring to FIGS 2 and 3, there is illustrated therein by vectors, a comparison between the prior art technique mentioned hereinabove and the technique in accordance with the principles of this invention. In both the prior art technique and the new technique, when there is a match between the binary condition of the input digital (binary) information signal and the local synchronization reference signal, the result is the same: namely, that the next bit examined is the corresponding bit in the next frame. This is illustrated by vector AC, FIG. 2, for the prior art technique and vector EG, FIG. 3, for the technique of this invention.

The difference between the prior art technique and the new technique occurs when there is a mismatch. In accordance with the prior art technique, when there is mismatch between the input information signal and the local synchronization reference signal, and a halt is allowed, the next bit examined is the next bit ($b$+1) of the next frame ($f$+1) as illustrated by vector AB, FIG. 2. In accordance with the technique of this invention, when a mismatch is present and halting is allowed, the next bit examined is the next bit ($b$+1) of the same frame ($f$) as illustrated by vector EF, FIG. 3.

Matches and mismatches occur with equal probability during synchronization search and this applies also to the two directions in which the search may proceed. Thus, the average direction of the search is the vectorial average shown by the broken line vector AD, FIG. 2, for the prior art technique and the broken line vector EH, FIG. 3, for the technique of this invention. It will be observed that there is a difference in slope of these two broken line vectors and it has been determined that there is a 2 to 1 ratio of the slopes to these vectors which is equivalent to a 2 to 1 ratio of the average search time. In other words, the search time employing the new technique is one-half of the search time of the prior art technique to achieve synchronization employing the distributed synchronization code.

Figure 4:
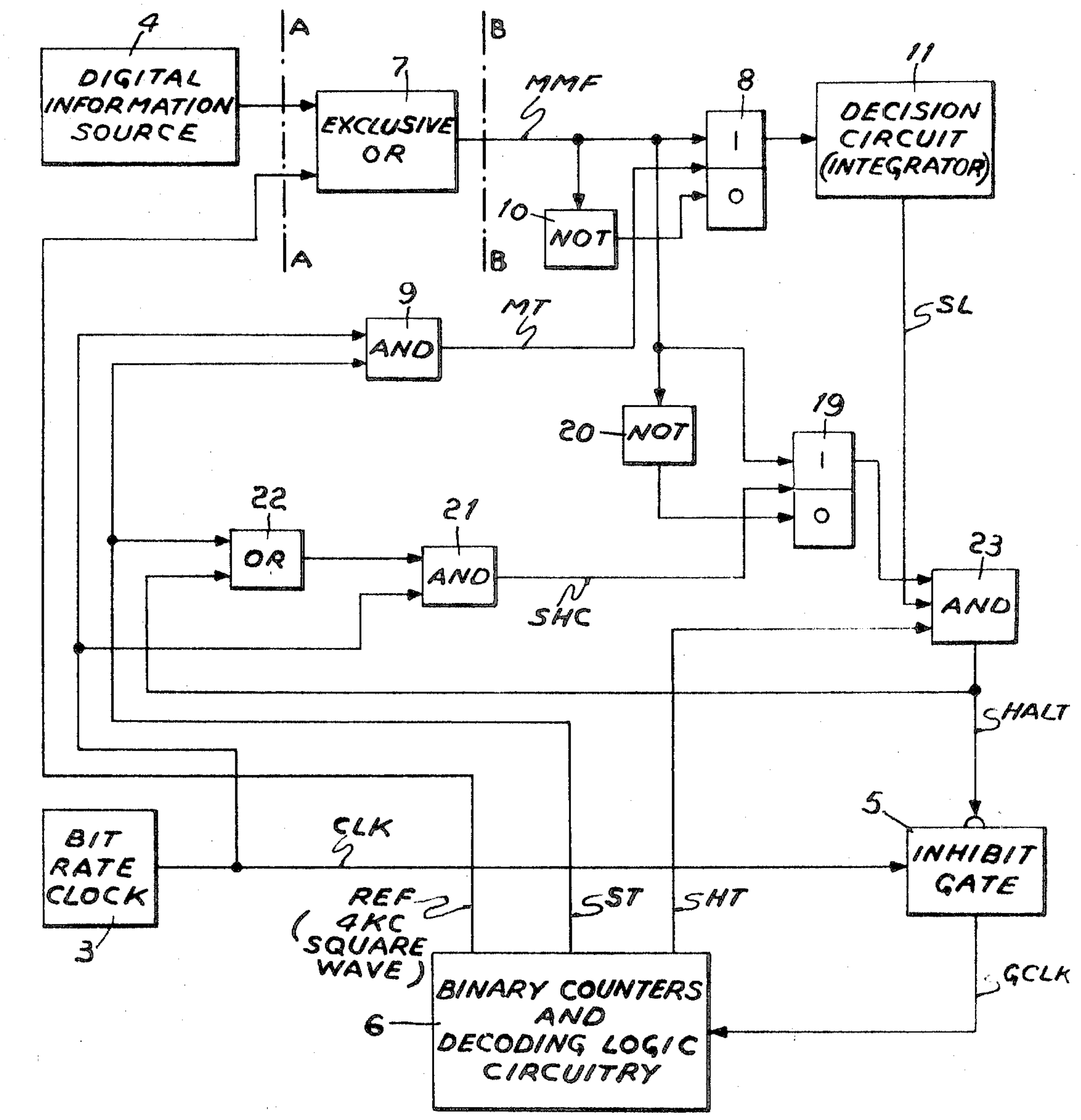
FIG. 4 is a block diagram of one embodiment of the frame synchronization system in accordance with the principles of this invention.

Referring to FIG. 4, there is illustrated therein a block diagram of one embodiment of the frame synchronization system of this invention. Clock 3 producing clock pulses at the bit rate of the digital (binary) information signal from source 4 is applied through INHIBIT gate 5 to binary counters and decoding logic circuitry 6 to produce various timing signals necessary for the operation of the frame synchronization system, as well as the timing signals necessary for other functions, such as to demultiplex the multiplexed signal received from source 4. For purposes of explanation, it will be assumed that the frame rate of the information signal is 8 kc., that the received one bit distributed synchronization code has the pattern in adjacent frames of 1, 0 and that the local synchronization reference signal referred to as REF is a 4 kc. square wave. Other timing signals generated by circuitry 6 are the synchronization bit time signal ST having a constant width of one clock period and the halt time signal HT having a varying width equal to the width of the HALT pulse plus the width of one clock period. The timing relation of theses pulses relative to the counting of the counters of circuitry 6 and the above width relations are illustrated in FIGS. 8 to 12.

The need for the halt time signal HT is to prevent the frame synchronization system from clocking in an unsynchronized and stationary condition upon power turn-on, since components 8, 11 and 19 could otherwise assume a combination of states that would stop the counters of circuitry 6. The lack of timing signals would prevent flip-flops 8 and 19 from leaving the above combination of states. By utilizing the halt time signals HT, the counters of circuitry 6 are allowed to stop only when timing signals are available to flip-flops 8 and 19.

The information signal from source 4 and the local synchronization reference signal REF from circuitry 6 are applied to a digital comparison means in the form of EXCLUSIVE OR gates 7 which compares the binary conditions of successive bits of the information signal and the REF signal. Gate 7 will then produce a resultant output signal which indicates match and mismatch between the binary conditions of two input signals applied thereto. The resultant output signal has been designated the MMF signal. The MMF signal is applied directly to flip-flop 8. Flip-flop 8 is triggered by the MT signal at the output of AND 9 to sample the MMF signal. AND 9 has its inputs coupled to clock 3 and the ST signal output from circuitry 6. The signal from gate 7 will be sampled by the leading edge of the MT signal and the state of flip-flop 8 will be changed on the trailing edge of the MT signal for the type of flip-flop assumed for illustration. Thus, if the MMF signal is a binary "1," representative of a mismatch, the output from flip-flop 8 will be changed to a binary "1" in time coincidence with the trailing edge of the MT signal. The output from gate 7 is also coupled to a NOT or inverter circuit 10. Thus, when the MMF signal is "0," the output of NOT 10 will be a "1" which will be sampled at the leading edge of the MT signal and at its trailing edge will cause flip-flop 3 to change its state, thus, providing on its "1" output a binary "0" condition.

The output from flip-flop 8 is coupled to decision circuit 11 which determines whether the samples presented thereto indicate a synchronized condition. Decision circuit 11 is an integrating circuit that may take many forms, such as, an integrating filter circuit, a Miller-type integrating circuit, or a reversible counter.

The output from circuit 7 is also coupled to flip-flop 19 directly and through NOT 20 with the triggering pulses therefore being provide from AND gate 21 and OR gate 22. The input to OR 22 is the ST timing signal from circuitry 6 and the output of AND gate 23 whose operation will be explained hereinbelow. The inputs to AND 21 is the output from OR 22 and the output from clock 3, thereby, generating a SHC trigger signal for flip-flop 19. AND 23 determines whether a HALT pulse should be coupled to the inhibit terminal of INHIBIT 5 to change the phase of the timing signals at the output of circuitry 6 by momentarily halting the counting of the binary counters. AND 23 receives the SL output of decision circuit 11 and the output from flip-flop 19. It should be noted at this point, that when the decision circuit 11 has a voltage under the decision level as shown in the dotted line 17$b$ of FIG. 6, there is a "1" binary output provided. When the voltage in the decision circuit 11 is above this decision level, then an "0" binary output is provided. It should also be noted that when there is a mismatch as indicated by the signal MMF from gate 7, there will be a "1" at the output of flip-flop 19. Also, the HT timing signal from circuitry 6 is coupled to AND 23 and has the purpose as hereinabove mentioned. Thus, when any of the input signals to AND 23 are in the "0" binary condition there is no HALT or inhibit signal produced and the counters of circuitry 6 will count normally without interruption. When all of the input signals are in the "1" condition, namely, HT timing signal is present, there is a "1" output from flip-flop 19 and SL signal is "1," and 23 will produce a HALT pulse which will inhibit gate 5, thus stopping the counting action of the counters of circuitry 4 and resulting in a shift of the phase or timing of the timing signals produced by circuitry 6. The amount of phase shift is dependent upon how many clock pulses are inhibited as will be explained hereinbelow.

Figure 5:
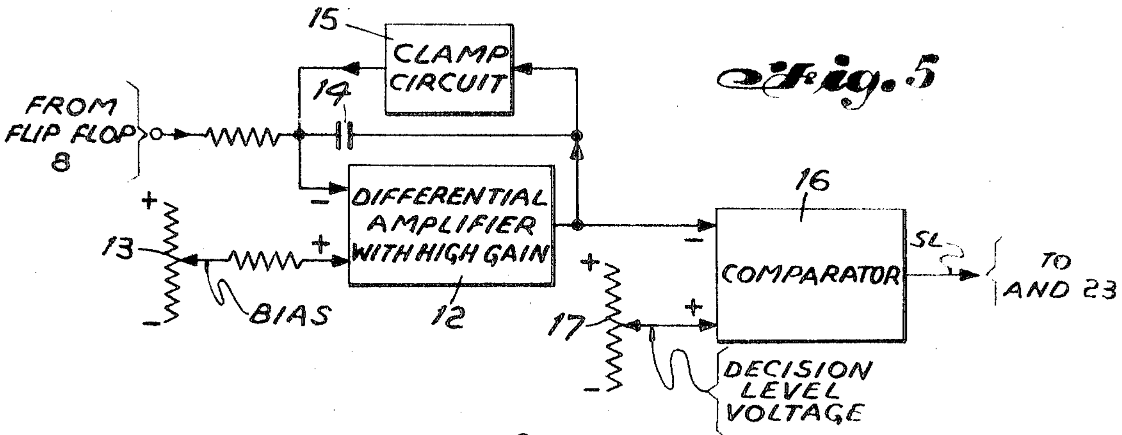
FIG. 5 is a block diagram illustrating one embodiment of the decision circuit of FIG. 4.

FIG. 5 illustrates in block diagram form a Miller integrator circuit to be employed as decision circuit 11. The Miller circuit includes differential amplifier 12 having its inverting (−) input coupled to flip-flop 8, and having a feedback circuit including capacitor 14 and clamp circuit 15, and having a bias voltage provided to its noninverting (+) input from potentiometer 13. Clamp circuit 15 uses negative feedback to prevent the output of amplifier 12 from going below a specified voltage, called the clamp voltage. Due to the high gain characteristic of amplifier 12 and the feedback circuit, the input signal from flip-flop 8 is integrated and applied to comparator 16 whose decision level voltage is provided by potentiometer 17 connected across a direct current voltage source.

Figure 6:
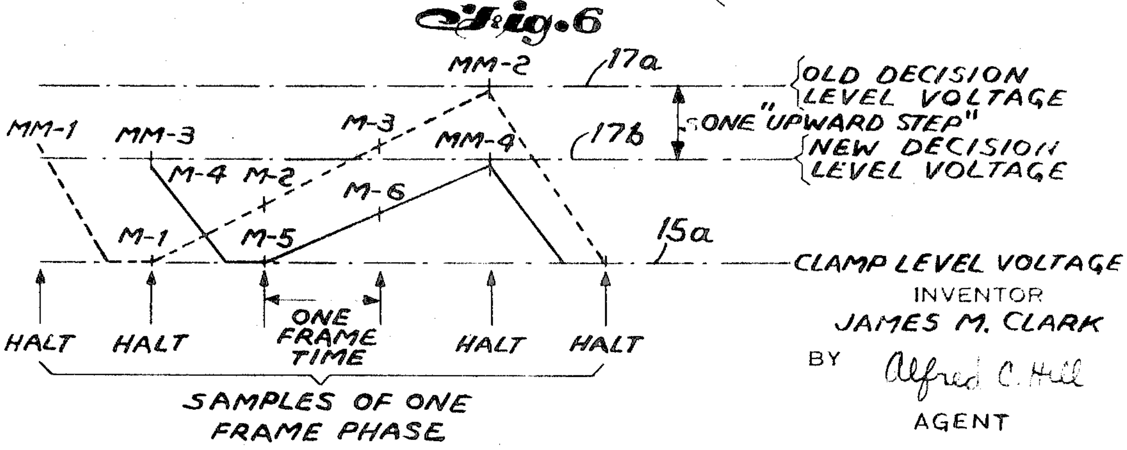
FIG. 6 is a diagram illustrating the operation of the circuit of FIG. 4.

FIG. 6 illustrates the operation of the circuit of FIG. 5. Broken line 17*a* indicates the decision level voltage for a prior art arrangement. When a match signal (M) is received from flip-flop 8, the voltage at the output of amplifier 12 increases as illustrated in FIG. 6 and for a mismatch signal (MM) from flip-flop 8 the voltage at the output of amplifier 12 decreases. However, it should be noted that the output voltage of amplifier 12 cannot go below the clamp level voltage 15*a* established by clamp 15. In the prior-art arrangement, halting, by inhibiting the clock pulses applied to the counter, occurs when the voltage goes below the decision level voltage and a mismatch occurs, such as indicated by the downward portions of the dashed voltage curve. Thus, the first mismatch MM—1 in the diagram of FIG. 6 occurs below decision level voltage 17*a* and a halt occurs. Therefore, the output voltage of amplifier 12 decreases, but to a value no lower than clamp level voltage 15*a*. The halt moves the counters of circuitry 6 to a new frame phase. The first three samples immediately after the halt are matches M-1, M-2 and M-3 making the voltage at the output of amplifier 12 increase. The fourth sample is a mismatch MM-2 and the voltage at the output of amplifier 12 is below decision level voltage 17*a* resulting in a halt and a subsequent decrease of voltage at the output of amplifier 12.

For reasons that need not be explained here, the decision level voltage can be adjusted to provide a compromise between faster search time and less sensitivity to bit errors. For example, the decision level might be adjusted for minimum average search at a specified bit error rate.

For the present invention, the operation of the decision circuit of FIG. 5 is similar to prior art, as described above, except that the first sample of a given frame phase has no effect on the decision circuit. This is a result of the ability of the present invention to sample more than one phase in one frame when there is a halt. Only the first sample of each frame is coupled to the decision circuit, and the additional samples, if any, effect the halt logic only. These additional samples are the first samples taken of their respective frame phases. If such a sample is a mismatch, the halt pulse will continue, and the phase of that sample will be rejected. Thus, in this case, the lock of an effect on the decision circuit is unimportant. If such a sample is a match, however, sampling of this phase will continue as controlled by the decision circuit.

The solid voltage curve of FIG. 6 shows the response of the decision circuit when the present invention is used, taking as an example the same sequence of matches and mismatches as for the prior art case. When the mismatch MM-3 occurs in one bit of the information signal below decision level voltage 17*a*, a halt occurs and the voltage at the output of amplifier 12 decreases as illustrated by the solid line. However, during the next bit of the information signal a match M-4 may occur and change the state of flip-flop 19, but not the state of flip-flop 8, which is the input of the decision circuit. The halt moves the counters of circuitry 6 to a new frame phase. The next two samples of the MMF signal by flip-flop 8 immediately after the halt are matches M5 and M6 making the voltage at the output of amplifier 12 increase. The third sample is a mismatch MM-4 and the voltage at the output of amplifier 12 is below decision level voltage 17*a* resulting in a halt and a subsequent decrease of voltage at the output of amplifier 12. Observing the solid line curve it will be noted that three matches have occurred as they did in the prior art, but that mismatches occurred at a lower voltage level which is less than "one upward step" away from decision level voltage 17*a*. "One upward step " is how many volts the voltage increases in the frame time following a match. Thus, in accordance with this invention the decision level voltage as established by potentiometer 17 is moved down "one upward step" as illustrated at 17*b*. Thus, the operation of the decision circuit is made precisely as it was before, and, therefore, any compromise (optimization) or other advantage of the decision circuit that could be obtained in the case of prior art can also be obtained in the case of this invention in addition to the advantages of this invention regarding the search logic.

Figure 7:
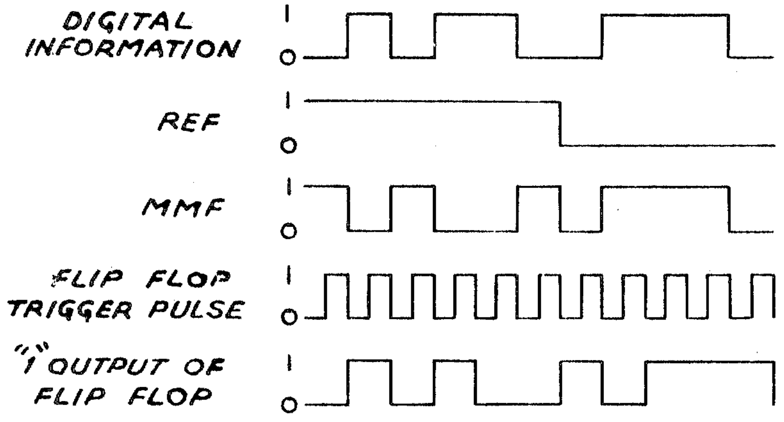
FIG. 7 is a timing diagram illustrating the operation of one embodiment of a flip-flop that may be employed in the system of FIG. 4.

Referring to FIG. 7, there is illustrated therein the operation of one type of flip-flop that may be employed for flip-flops 8 and 19 without regard to the output signals from AND's 9 and 21, namely, the clock signal is directly applied to these flip-flops for triggering purposes. The primary purpose of this illustration is to show the relationship between the output of flip-flops 8 and 19 relative to the input signal MMF applied thereto. The information signal is illustrated in the DIGITAL INFORMATION curve which is compared to the local synchronizing reference signal as illustrated in curve REF which, for the example set forth hereinabove, is a 4 kc. square wave. Curve MMF illustrates the resultant output signal of gate 7, when the binary conditions of the DIGITAL INFORMATION curve and REF curve have been compared. The flip-flop trigger pulses are in effect the clock pulses without limitation by the ST timing and HALT signals. The last curve in FIG. 7 shows the outputs of the flip-flops relative to the input signal MMF and it will be observed that the flip-flop output is shifted in time by one bit period due to the action of each trigger pulse which at its leading edge samples the MMF signal and at its trailing edge causes a change of state of the flip-flop.

The following description will relate to the operation of the circuit of FIG. 4 for five different typical situations. The reference letters identifying the curves are appropriately identified at the proper point in the system of FIG. 4.

Figure 8:
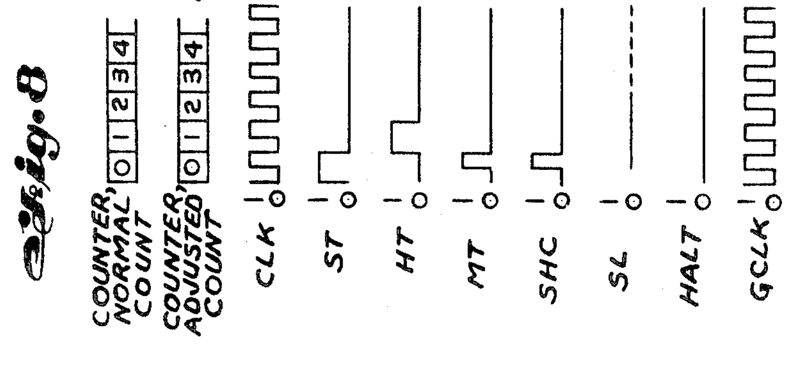

Referring to FIG. 8, there is illustrated the timing diagram for situation one where the decision circuit voltage is above the decision level voltage. In this situation the SL signal at the output of circuit 11 is a binary "0" and, thus, will render AND 23 inoperative resulting in no HALT pulse and, hence, no inhibiting of the clock pulses of clock 3.

Figures 9, 10, 11, 12:
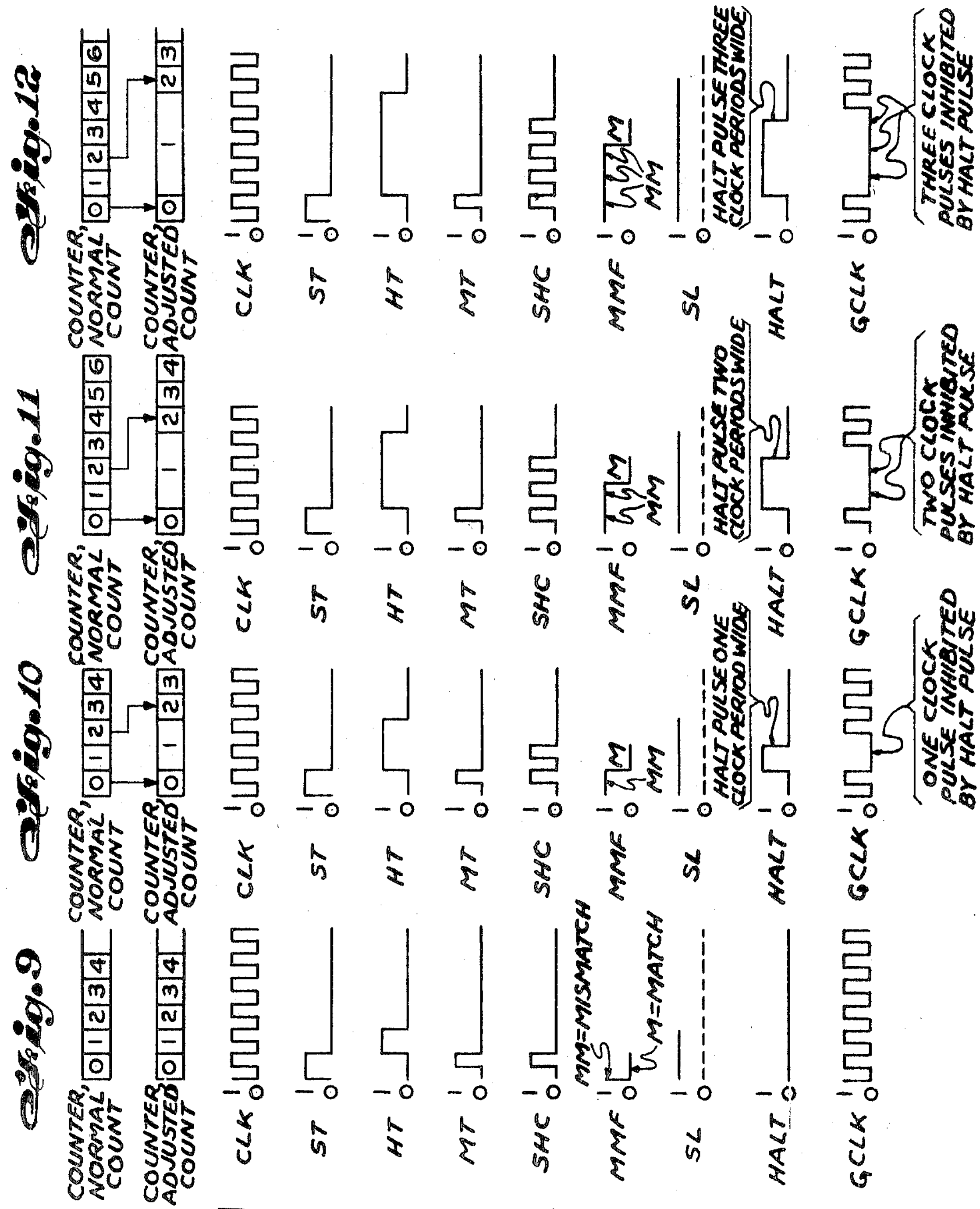
FIG. 8 through 12 are timing diagrams illustrating the operation of the frame synchronization system of this invention for five different typical situations that may exist therein.

Referring to FIG. 9, there is illustrated therein a timing diagram for situation two wherein the voltage of decision circuit 11 is below the decision level voltage and the first sample is a match. In this situation, output signal SL from decision circuit 11 is a binary "1," but the output from flip-flop 19 due to the match is a binary "0" during the halt time signal HT Thus, the "0" output from flip-flop 19 renders AND 23 inoperative and produces no halt pulse.

Referring to FIG. 10, there is illustrated the timing diagram for situation three where the decision circuit voltage is below the decision level voltage, the first sample is a mismatch and the second sample is a match. In this situation there is an additional trigger pulse in signal SHC which is due to the fact that the HT signal from circuitry 6 is extended in duration due to the halting of the counting of the counters of circuitry 4. In other words, the counters stay in the states they had gone to just prior to the halting and, thus, signal HT is extended by one bit period. In this situation there is a "1" input to AND 23, during the time of the HT pulse, from decision circuit 11 and flip-flop 19, since flip-flop 19 advances the condition of the MMF signal by one bit period. This results in a HALT pulse having a width of one clock period wide. The production of the HALT pulse is stopped, since the match at the second sample and the one bit period shift in flip-flop 19 results in a "0" to AND 23. This HALT pulse is applied to INHIBIT 5 which inhibits one pulse output from clock 3 prior to application to the binary counters of circuitry 6.

Referring to FIG. 11, there is illustrated the timing diagram for situation four where the decision circuit voltage is below the decision level voltage, AND first and second samples are mismatches and the third sample is a match. Here again, due to the HALT pulse, the HT signal is extended by two bit periods and three trigger pulses are provided for signal SHC for triggering flip-flop 19. Thus, due to the one bit period shift of the output of flip-flop 19 which respect to the MMF signal all the inputs to AND 23 are in the binary state "1" resulting in a HALT pulse having a width two clock periods wide. The production of the HALT pulse is stopped since the match at the third sample and the one bit period shift in flip-flop 29 results in a "0" to and 23. This HALT pulse is applied to INHIBIT 5 which inhibits two clock pulses from source 3 prior to application to the binary counters of circuitry 6.

Referring to FIG. 12, a fifth situation is illustrated wherein the decision circuit voltage is below the decision level voltage, the first, second and third samples are mismatches and the fourth sample is a match. Here again, due to a halt pulse, the HT signal is extended three bit periods and four trigger pulses are provided for signal SHC for triggering flip-flop 19. Due to the presence of the HT signal, the "1" output from circuit 11 and the "1" output from flip-flop 19 shifted one bit period in time with respect to the MMF signal, AND 23 is activated and results in a HALT pulse having a width of three clock periods wide. The production of the HALT pulse is stopped, since the match at the fourth sample and the one bit period shift in flip-flop 19 results in a "0" to AND 23. From the foregoing, it will be recognized that the phase or counting of the counters are changed at the bit rate of the information signal resulting in a reduction of search time to one-half the search time required by the conventional frame synchronizing systems mentioned hereinabove when employing a distributed synchronization code.

Figures 13, 14:
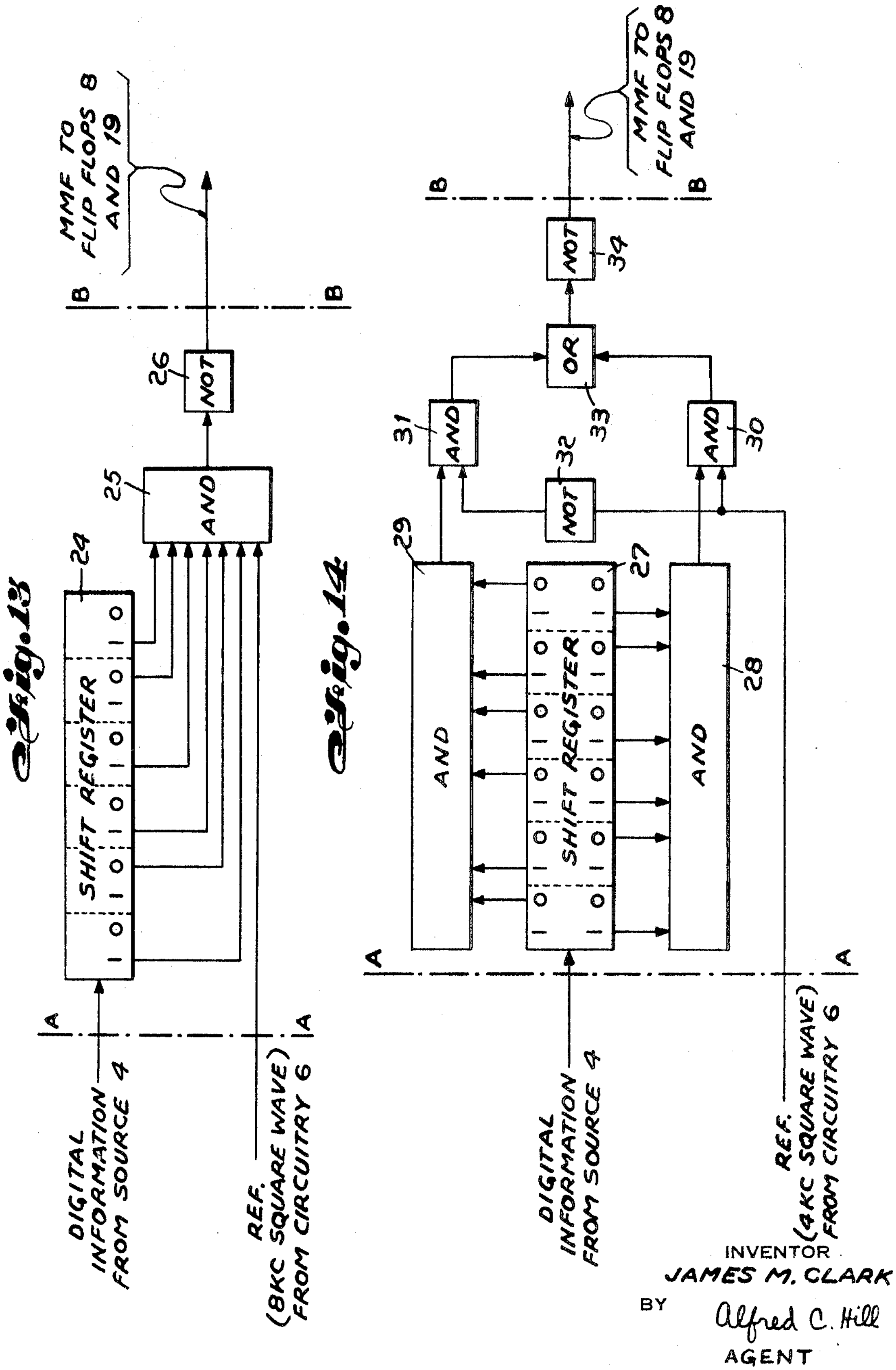
FIG. 13 is a block diagram of one embodiment of an arrangement that may be substituted for the arrangement between lines A–A and B–B of FIG. 4 for a lumped type of synchronization code as defined hereinabove.
FIG. 14 is a block diagram of one embodiment of an arrangement that may be substituted for the arrangement between lines A–A and B–B of FIG. 4 to achieve synchronization according to the present invention for a combined lumped and distributed type of synchronization code as defined hereinabove.

Referring synchronization fig. 13, there is illustrated a digital comparison means that may be substituted for EXCLUSIVE OR 7 of FIG. 4 between lines A–A and B–B to render the synchronization system of this invention responsive to the lumped-type synchronization code. As assumed hereinabove, for purposes of explanation, the lumped synchronization code pattern is 101101. Successive bits of the information signal are shifted into a six-stage shift register 24, each stage including, for instance, a flip-flop. The appropriate "1" or "0" output of each flip-flop of register 24 is coupled to AND gate 25, as illustrated, to recognize the assumed lumped code pattern. AND 25 also has coupled thereto the REF signal from circuitry 6 which is this embodiment, for the example employed herein, would be an 8 kc. square wave properly phased to have a "1" state at the time when the synchronization code should be present. When a "1" appears on all inputs to AND 25, a match is present and a "1" appears at the output of AND 25. When a "0" appears on any one of the inputs to AND 25, a mismatch is present and a "0" appears at the output of AND 25. However, these outputs from AND 25 are opposite to the requirements of the MMF function from gate 7 wherein a match is represented by "0" and a mismatch is represented by a "1." To overcome this inversion, the output signal of AND 25 is coupled to NOT 26 to provide an MMF signal at the output of the digital comparison means of FIG. 13 to having identical representations as the MMF output signal of gate 7, FIG. 4. Therefore, the remainder of the circuit of FIG. 4 will operate as previously described.

Referring to FIG. 14, there is illustrated a digital comparison means that may be substituted for EXCLUSIVE OR 7 of FIG. 4 between lines A–A and B–B to render the synchronization system of this invention applicable to the combined lumped and distributed synchronization code. As assumed hereinabove, for purposes of explanation, this combined synchronization code pattern is 101101, in one frame of a two frame multiframe, and 010010, in the other frame of the two frame multiframe. Successive bits of the information signal are shifted into a six-stage shift register 27, each stage including, for instance, a flip-flop. The appropriate "1" or "0" output of each flip-flop of register 27 is coupled to AND 28, as illustrated, to recognize the assumed code pattern 101101 and the appropriate "1" or "0" output of each flip-flop of register 27 is coupled to AND 29, as illustrated, to recognize the assumed code pattern 010010. A "1" output from AND 28 indicates that the code 010010 has been recognized while a "1" output from and 29 indicates that the code 010010 has been recognized. One input of AND 30 is coupled to the output of AND 28 and the other input of AND 30 receives the REF signal directly from circuitry 6 which in this embodiment, for the example employed herein, would be a 4 kc. square wave properly phased to have a "1" state at the time when the synchronization code 101101 should be present in the one frame of the two frame multiframe. One input of AND 31 is coupled to the output of AND 29 and the other input of AND 31 receives the REF signal from circuitry 6 through NOT 32 to provide the REF signal with a "1" state at the time when the synchronization code 010010 should be present in the other frame of the two frame multiframe. The output of AND's 30 and 31 are coupled to OR 33. When signal REF is "0," the output of NOT 32 will be "1" , allowing the condition from AND 29 to appear at the output of AND 31, and the output of AND 30 will be "0" , allowing the condition from AND 31 to appear at the output of OR 33, which will be the condition of AND 29. However, when the signal REF is "1," the condition of AND 28 will appear at the output of AND 30, and the output of NOT 32 will be "0," making the output of AND 31 "0," which will allow the condition from AND 30 to appear at the output of OR 33, which will be the condition of AND 28. Thus, the condition of any signal REF selects whether the condition of AND 29 (or else of AND 28) will appear at the output of OR 33. Since the outputs of AND 28 and AND 29 indicate a match (if "represented 1") or a mismatch (if "0") of the input information and the associated codes, the output of OR 33 will indicate in the same manner a match or a mismatch of the input information with the code selected by the condition of the signal REF. It should be noted that the output signal from OR 33 is opposite to the requirements of the MMF function from gate 7 wherein a match is represented by "0" and a mismatch is represented by a "1." To overcome this inversion, the output signal or OR 33 is coupled to NOT 34 to provide a MMF signal at the output of the digital comparison means of FIG. 14 having identical representations as the MMF output signal of gate 7, FIG. 4. Therefore, the remainder of the circuit of FIG. 4 will operate as previously described.

Employment of the system of FIG. 4 with the digital comparison means of FIG. 14 for a combined lumped and distributed synchronization code will result in a reduction of search time relative to the search time of related prior art which appears to be of the same magnitude, at least for some cases, as that achieved by the system of FIG. 4 for a distributed synchronization code.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frame synchronization system comprising:

a source of binary information signal having a given bit rate and containing a synchronization component having a predetermined repetition frequency; synchronization first means to produce a plurality of timing signals, said timing signals including at least a sychronization reference signal in the form of a rectangular wave signal having a repetition frequency equal to said predetermined repetition frequency and a duration greater than the duration of said synchronization component;

second means coupled to said source and said first means, said second means being responsive to said information signal and said reference signal to examine successive bits of said information signal within a given frame with respect to said reference signal to detect said synchronization component and produce a resultant output signal at each examination; and third means coupled to said second means and said ,first means, said third means being responsive to said resultant output signal to provide a control signal for timing adjustment of said timing signal of said first means when said resultant output signal indicates an out-of-synchronization condition until synchronization is achieved.

2. A system according to claim 1, wherein said second means includes digital comparison means coupled to said source and said first means to compare the binary condition of successive bits of said information signal and the binary condition of said reference signal and produce said resultant signal.

3. A system according to claim 2, wherein said digital comparison means includes an EXCLUSIVE OR circuit.

4. A system according to claim 2, wherein said first means includes a source of clock signal having said given rate, binary counter means, timing decoding means coupled to said counter means to produce said timing signals and said reference signal, and inhibit means coupled between said source of clock signal and said counter means and to said third means responsive to said control signal to carry out said timing adjustment.

5. A system according to claim 2, wherein said third means includes .

fourth having a decision level coupled to said second means to produce a binary "1 " output when the voltage therein resulting from said resultant output signal is less than said decision level and a binary "0" output when the voltage therein resulting from said resultant output signal is greater than said decision level.

6. A system according to claim 5, wherein said third means further includes fifth means coupled to said fourth means and said second means to produce said control signal when said fourth means produces a binary "1" output and simultaneously said resultant output signal indicates a mismatch of the binary condition of said reference signal and said information signal.

7. A system according to claim 6, wherein said fifth means includes an AND circuit coupled to said fourth means and said second means.

8. A system according to claim 6, wherein said third means includes first bistable means triggered at said given fit rate coupled between said second means and said fourth means, and second bistable means triggered at said given fit rate coupled between said second means and said fifth means.

9. A system according to claim 8, wherein said first and second bistable means each include a flip-flop circuit.

10. A system according to claim 2, wherein said first means includes a source of clock signal having said give bit rate binary counter means, and decoding means coupled to said counter means to produce said timing signals and said reference signal, and inhibit means coupled between said source of clock signal and said counter means;

said digital comparison means includes an EXCLUSIVE OR: and said third means includes fourth means having a decision level coupled to said EXCLUSIVE OR to produce a binary "1" output when the voltage therein resulting from said resultant output signal is less than said decision level and a binary "0" output when the voltage therein resulting from said resultant output signal is greater than said decision level, and fifth means coupled to said fourth means and said EXCLUSIVE OR circuit to generate said control signal for coupling to said inhibit means to carry out said timing adjustment, said control signal being generated when said fourth means produces a binary "1" output and simultaneously said resultant output signal indicates a mismatch of the binary condition of said reference signal and said information signal.

UNITED STATES PATENT OFFICE
CERTIFICATE OF CORRECTION

Patent No. 3,597,539 Dated August 3, 1971

Inventor(s) James M. Clark

It is certified that error appears in the above-identified patent and that said Letters Patent are hereby corrected as shown below:

Claim 1, column 9, line 4, cancel "synchronization".

Signed and sealed this 4th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334